June 28, 1960 K. BEERLI 2,942,919
BEARING ARRANGEMENT ON A VERTICAL SHAFT
Filed Feb. 25, 1957 2 Sheets-Sheet 1

INVENTOR.
KARL BEERLI
BY

INVENTOR.
KARL BEERLI

United States Patent Office 2,942,919
Patented June 28, 1960

2,942,919

BEARING ARRANGEMENT ON A VERTICAL SHAFT

Karl Beerli, Uster, Switzerland, assignor to Spindel-, Motoren- und Maschinenfabrik A.G., Uster, Switzerland, a company of Switzerland Filed Feb. 25, 1957, Ser. No. 641,940

Claims priority, application Switzerland Feb. 25, 1956

4 Claims. (Cl. 308—187)

This invention relates to a bearing arrangement on a vertical shaft.

In the textile industry there exists today a need for bearings permitting shafts of working spindles to run at speeds in excess of 40,000 r.p.m. and possessing moreover a relatively long service life with small maintenance costs.

As is known, the greatest difficulty attendant on such high-speed bearings is the provision of suitable lubrication. Grease lubrication is inadequate for operation at high speeds since the temperature of the bearing becomes too high and the driving power required is too great for economic running. Besides, there is a danger of too large a quantity of grease being supplied when the bearing is relubricated.

Although it possesses the great advantage of permitting a dosed feed of lubricant, oil mist lubrication is not suitable for textile machines because the numerous spindle bearings of the machine must be connected by means of feed pipes. Furthermore, unless provision is made for drawing off the oil mist from the bearings, mist issuing therefrom is deposited on the textiles, which is undesirable. Moreover, the loss of oil is rather high. If, however, the oil mist is drawn off by means of pipes, costs are again increased according to the number of spindles and their appurtenant bearings in the machine.

Bearing arrangements for vertical shafts rotating at speeds of the order of 2000 r.p.m. are known which provide a ring-shaped oil chamber above and below the roller bearing supporting shaft. The lower chamber serves as a reservoir and the two chambers communicate on the one hand via the said bearing and on the other hand via a wick so as to procure a continuous circulation of oil for the purpose of lubricating and cooling the bearing.

This bearing arrangement has proved very satisfactory in service at speeds of the order mentioned, more particularly because virtually no maintenance is required. Experience shows, however, that difficulties are encountered when this principle is applied to vertical shafts running at speeds in excess of 10,000 r.p.m. These are observable in the rapid heating of the bearing and the resulting increase of power required to overcome frictional and heat losses. Moreover the oil becomes atomized, which is undesirable for the reasons indicated as disadvantageous in regard to oil mist lubrication.

Furthermore, it must be considered that where vertical shafts are operated by means of a friction drive, e.g. by contact with a rotating belt, the troublesome phenomena mentioned above result in a decrease of the shaft speed due to losses of power from friction, etc. A decrease of speed is undesirable more especially in the case of textile machines, e.g. doubling frames, where the variation of speed results in a difference in the quality of the yarn.

For this reason investigations were instituted with a view to establishing the causes of these phenomena. These investigations show that the phenomena are usually a direct consequence of non-uniform lubrication, that is to say that the oil feed to the bearing does not take the form of a continuous film but rather of drops which collect above the bearing and make their entry into it on reaching a certain size. It was established in the course of further investigations on the effects of speed that drops of lubricant form only at speeds in excess of 10,000 r.p.m., the oil flowing continuously into the bearing at speeds below this figure, and that the oil is evidently impeded on entry into the bearing by an air flow generated by the high speed of the rotating shaft. The air entrained by the shaft is driven outwards and pushes back the oil. When, however, the accumulation of oil is large enough to overcome the effect of the air flow, the whole drop of lubricant discharges into the bearing and momentarily floods it, thus giving rise to changes in speed and to the other troublesome phenomena mentioned above.

The purpose of the present invention is to produce a bearing arrangement in which these disadvantages are obviated.

The bearing arrangement according to the present invention is provided with conveying agents for the purpose of transporting air from an upper to a lower chamber about an eye bearing and thus facilitating the flow of oil from the upper chamber into the bearing.

By means of these conveying agents the air flow opposing the entry of the oil into the bearing can be eliminated or at least partly diverted into the bearing, whereby oil is entrained simultaneously.

The conveying agents, which may, by way of example, take the form of rotating vanes, are preferably arranged below the bearing. With a view to maintaining the air in the two oil chambers at a more or less equal pressure in spite of the effect of the conveying agents, it is advantageous to connect the two chambers by means of an additional air duct through which the air taken from the upper chamber may be replaced by a supply from the lower chamber. In this way outside air can be prevented from entering the upper chamber and air in the lower chamber can be prevented from leaking out even though the two chambers cannot be sealed off from the atmosphere. It is important that this exchange of inside and outside air should be prevented because, apart from the fact that the outside air is usually heavily laden with dust, the air inside the chamber contains oil mist which would settle on escaping. The drawing shows, by way of example, an embodiment of the bearing arrangement according to the present invention.

Figure 1:
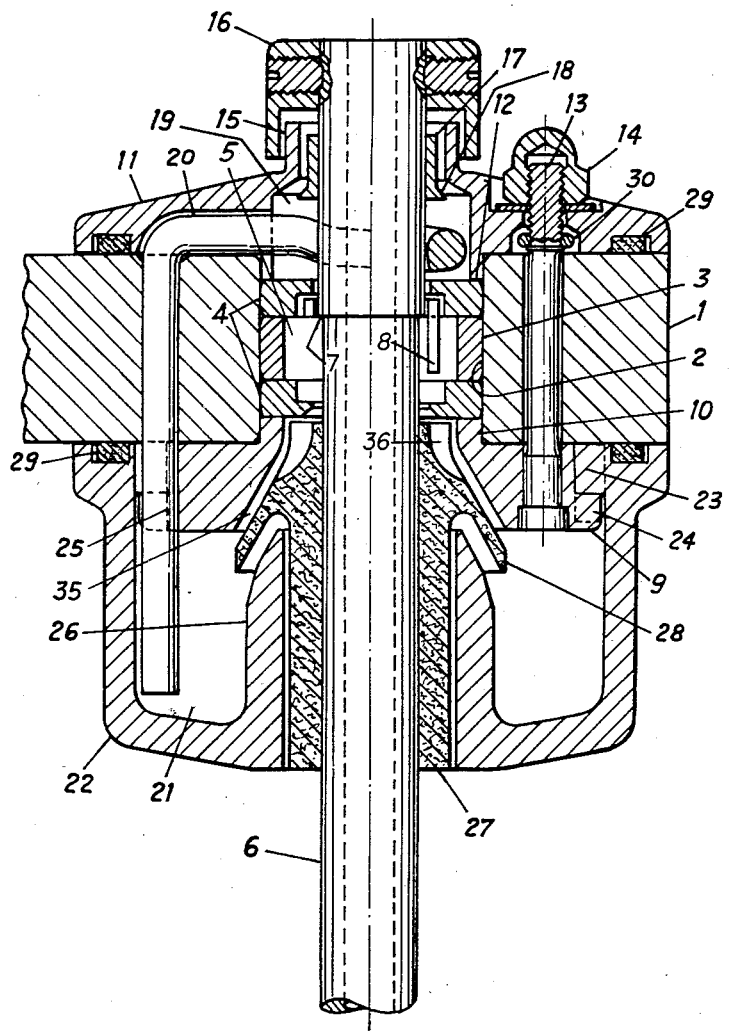
Fig. 1 is a vertical sectional view as taken along the line I—I in Fig. 3.
Figure 2:
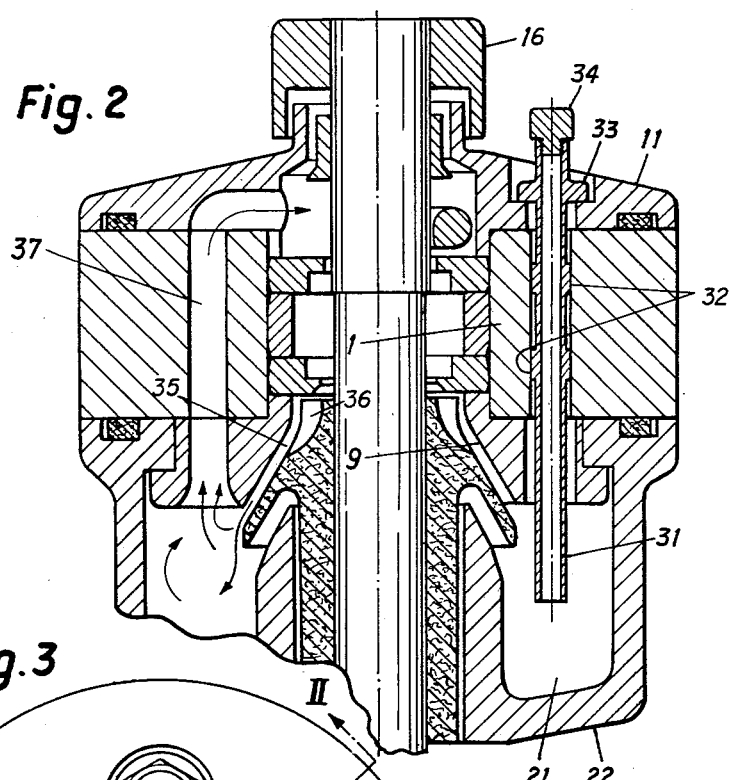
Fig. 2 is a vertical sectional view as taken along the line II—II in Fig. 3.
Figure 3:
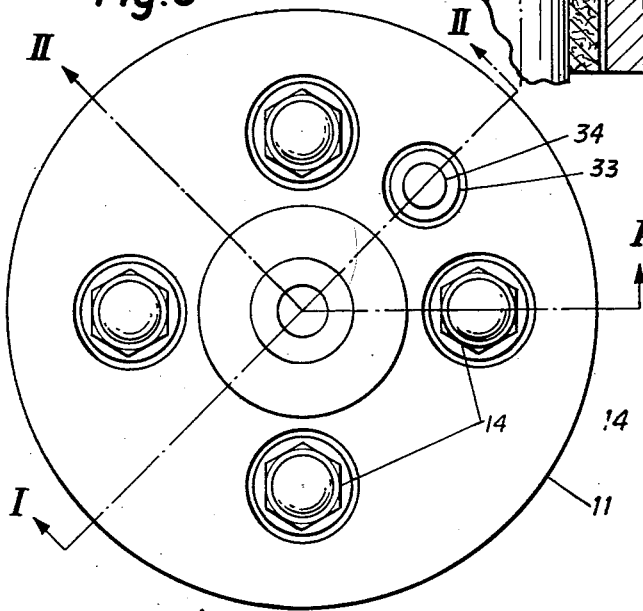
Fig. 3 is a plan view of the bearing arrangement.

With continuing reference to the accompanying drawings wherein like reference numerals designate similar parts throughout the various views, there is mounted in the frame of a textile machine (not shown) eye bearing 1, having a hole 2 containing a bearing ring 3 and, disposed one on either side of the bearing ring 3, are two guide rings 4. In this bearing ring 3, between the guide rings 4, three rollers 5 are arranged through which the shaft passes and on which it is supported by means of a shoulder 7. The rollers are guided and spaced at uniform intervals about the periphery of the shaft 6 by means of a cage 8. At the bottom of the eye bearing 1 there is a thrust ring 9 whose shoulder 10 projects into the hole 2. The lower guide ring 4, which takes the axial force transmitted by the rollers, bears upon this shoulder 10. At the top of the eye bearing 1 a bearing cap 11 is arranged whose shoulder 12 bears upon the upper guide ring 4. The thrust ring 9 and bearing cap 11 are drawn together by means of bolts 13 which pass through drill holes in the eye bearing 1 and hat nuts 14 (only one of each is shown). The bolts 13 hold the rings 3 and 4 of the roller bearing firmly therebetween. At the top of the bearing cap 11 there is a central, cylindrical extension 15 over which is located a dust cap 16 mounted on the shaft. Inside the extension 15 a sleeve 17 with a collar 18 at its lower end is mounted on the shaft 6. In conjunction with the guide ring 4 the bearing cap 11 forms an oil chamber 19 into which extends a wick 20. The wick passes through a hole in the eye bearing 1 and extends vertically into an oil-filled reservoir 21 formed in a ring-shaped container 22 of transparent material located at the bottom of the eye bearing. At the top of the container 22 there are a number of projections pointing inwards which engage over a flange 24 formed in the thrust ring 9 by means of which the container 22 is maintained firmly in position against the eye bearing 1. In the periphery of the flange 24 there is a corresponding number of recesses 25 adapted to the projections 23 so that, on the nuts 14 being loosened, the container 22 can be removed by suitably turning it until the projections 23 coincide with the recesses 25 of the flange. To form the boundary of the oil reservoir 21 the container has a collar 26 which surrounds the shaft 6 and is tapered at its upper end. A packing sleeve 27 is fitted onto the shaft 6 and connected to it so that it rotates without twisting. The packing sleeve 27 has at its upper end a cuff-shaped extension 28 which reaches down over the collar 26 and serves as a slinger ring. The container 22 and the cap 11 each have on the side facing the eye bearing 1 a sealing ring washer 29 located in a peripheral groove. An oil filling tube 31 extends through a drill hole provided in the bearing cap 11, eye bearing 1 and thrust ring 9 into the oil reservoir 21 formed in the container 22. There are two peripheral ribs 32 on the central portion of the oil filling tube 31 by means of which the tube is forced into the drill hole of the eye bearing 1. At the same time the filling tube 31 is supported on the bearing cap 11 by means of a shoulder 33 provided at its upper end. The filling tube is sealed by means of a plug 34 which is screwed into it.

Between the central bore of the thrust ring 9 and the packing sleeve extension 28 an annular gap 35 is formed communicating on the one hand with the reservoir 21 and on the other with the oil chamber 19. Into this annular gap 35 project vanes 36 which are formed in the packing sleeve. An air duct 37 opening into the oil chamber 19 and connecting the latter with the reservoir 21 extends through the thrust ring 9, the eye bearing 1 and the bearing cap 11.

When the shaft 6, which is supported below the bearing arrangement shown by a second bearing, is set in motion, oil which has accumulated at the end of the wick immediately adjacent to the shaft is released and drips onto the guide ring 4. Under the influence of the vanes 36 in the annular gap 35 which act as conveying agents, air flows from the oil chamber 19 through the bearing into the reservoir 21. The oil trickling onto the guide ring 4 and flowing towards the shaft is entrained by this air flow through the intervening gap into the bearing and at the same time the effect of the air which is accelerated by the shaft and thus driven outwards and which opposes the flow of oil into the gap is counteracted.

The oil entering the bearing through the gap arrives at the rollers 5, thus lubricating the running surfaces of the shaft and of the ring 3 as well as the shoulders of the guide rings 4. Under the influence of gravity and the air flow the oil then passes through the lower guide ring to the packing sleeve 27 and thus into the annular gap 35 through which it flows downwards and at the same time outwards.

The cuff-shaped extension 28 thus prevents the oil flowing out of the container between the shaft and the collar 26. The oil arriving at the end of the extension 28 is eventually precipitated into the oil-filled reservoir 21 where it cools and whence it rises into the upper chamber 19 by way of the wick 20. The oil in the oil chamber 19 flung upwards by the shaft 6 impinges upon the collar 18 of the packing ring 17 which deflects the oil to the wall of the oil chamber 19.

The air duct 37 between reservoir 21 and oil chamber 19 permits the air sucked from the oil chamber by means of the vanes 36 to be returned thither and the pressure thus to be equalized between said chamber and the reservoir and also the balance to be maintained between internal and external pressures without an exchange of air with the atmosphere.

The bearing arrangement described has the great advantage that a uniform feed of oil in small quantities is made possible even at high speeds, for the efficacy of the conveying agents, which may take a form other than the vanes 36, increases with the speed.

If the oil in the container 22 has to be changed, the latter is removed from the flange 24 of the ring 9 by loosening bolts 13 and nuts 14 and then turning container 22 so that the reservoir therein is directly accessible.

As shown in the drawing the bolt 13 has secured to it below its threaded end a spring ring 30 which prevents the bolt falling into the reservoir when the nut 14 is removed.

The wick may either consist of absorbent material or have a surface which induces the oil to rise into the oil chamber 19. The wick may with advantage contain stiffening material which enables it to be maintained in a certain position immediately adjacent to the shaft 6. Needless to say, the upper end of the wick may be in direct contact with the shaft 6. The oil circulation can be modified not only by selecting oil of varying viscosity but also by selecting a particular material for the wick. It is, of course, also possible to use a number of wicks instead of only one. At all events care must be exercised lest too much oil is fed to the bearing. By using a container 22 of transparent material it is always a simple matter to check the oil level in reservoir 21, which is of importance wherever there are a large number of bearing arrangements as, for example, in textile machines.

The bearing arrangement described has the further advantage that the openings through which the shafts leave the bearing, i.e. the passages through the two oil chambers, can be sealed off from the outside without causing friction, for the collar 18 and the cuff-shaped extension 28, which two parts serve as slinger rings, entirely prevent the oil issuing from the interior of the bearing which communicates with the atmosphere.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A roller bearing arrangement for a hollow high-speed vertical shaft for textile machinery comprising an eye bearing having a hole therethrough through which said shaft extends, a bearing ring assembly rotatably mounted on said shaft and disposed in said hole, said bearing ring assembly including upper and lower stationary guide rings means above and below said eye bearing engaging said bearing ring assembly and forming in conjunction with said stationary guide rings two ring-shaped oil chambers one above and one below said bearing ring assembly, means rotating with said shaft extending into the lower of said oil chambers to suck oil from the upper of said oil chambers through said bearing ring assembly and into said lower oil chamber, and a wick extending through said eye bearing and extending from said lower oil chamber to said upper oil chamber with an end thereof positioned above said upper stationary guide rings, said eye bearing having an air duct connecting said upper oil chamber with said lower oil chamber to equalize pressure in said oil chambers.

2. A roller bearing arrangement for a hollow high-speed vertical shaft for textile machinery comprising an eye bearing having a hole therethrough, through which said shaft extends, a bearing ring assembly rotatably mounted on said shaft and disposed in said hole, said bearing ring assembly including upper and lower stationary guide rings, a bearing cap disposed above said eye bearing and engaging said eye bearing and said upper stationary guide ring to form an upper oil chamber above said bearing ring assembly, a thrust ring disposed below said eye bearing and engaging said eye bearing and said lower stationary guide ring, a container disposed beneath said bearing ring assembly, fastening means engaging and drawing together said thrust ring and said bearing cap and drawing said thrust ring in engagement with said container to hold said container against said eye bearing forming a lower oil chamber below said bearing ring assembly, means rotating with said shaft extending into said lower oil chamber to suck oil from said upper oil chamber through said bearing ring assembly and into said lower oil chamber, and a wick extending through said eye bearing and extending from said lower oil chamber to said upper oil chamber with an end of said wick being disposed above said stationary guide ring, said eye bearing having an air duct connecting said upper oil chamber with said lower oil chamber to equalize pressure in said oil chambers.

3. A roller bearing arrangement for a hollow high-speed vertical shaft for textile machinery comprising an eye bearing having a hole therethrough through which said shaft extends, a bearing ring assembly rotatably mounted on said shaft and disposed in said hole, said bearing ring assembly including upper and lower stationary guide rings, means above and below said eye bearing engaging said bearing ring assembly and forming in conjunction with said stationary guide rings two ring-shaped oil chambers one above and one below said bearing ring assembly, a packing sleeve fixed to and rotating with said shaft and extending into the lower of said oil chambers, said packing sleeve having vanes thereon for sucking oil from the upper of said oil chambers through said bearing ring assembly and into said lower oil chamber, said packing sleeve having a cuff overlying a portion of said means forming said lower oil chamber, and a wick extending through said eye bearing and extending from said lower oil chamber to said upper oil chamber, said wick having an end thereof disposed above said upper stationary guide ring, said eye bearing having an air duct connecting said upper oil chamber with said lower oil chamber to equalize pressure in said oil chambers.

4. A roller bearing arrangement for a hollow high-speed vertical shaft for textile machinery comprising an eye bearing having a hole therethrough through which said shaft extends, a bearing ring assembly rotatably mounted on said shaft and disposed in said hole, said bearing ring assembly including upper and lower stationary guide rings, a bearing cap disposed above said eye bearing and engaging said eye bearing and said upper stationary guide ring to form an upper oil chamber above said bearing ring assembly, a thrust ring disposed below said eye bearing and engaging said eye bearing and said lower stationary guide ring, a container disposed beneath said bearing ring assembly, fastening means engaging and drawing together said thrust ring and said bearing cap and drawing said thrust ring in engagement with said container to hold said container aginst said eye bearing forming a lower oil chamber below said bearing ring assembly, a packing sleeve fixed to and rotating with said shaft, said packing sleeve extending into said lower oil chamber and having vanes in said lower oil chamber for sucking oil from the upper oil chamber through said bearing ring assembly and into said lower oil chamber, said packing sleeve having a cuff overlying a portion of said means forming said lower oil chamber, and a wick extending through said eye bearing and extending from said lower oil chamber to said upper oil chamber with an end of said wick being disposed above said stationary guide ring, said eye bearing having an air duct connecting said upper oil chamber with said lower oil chamber to equalize pressure in said oil chambers.

References Cited in the file of this patent

UNITED STATES PATENTS

| 1,499,949 | Sawyer | July 1, 1924 |
| 1,769,736 | Fieux | July 1, 1930 |
| 1,924,189 | Hall | Aug. 29, 1933 |
| 2,042,575 | Worth | June 2, 1936 |